T. GRIFFIN.
Flower-Pot.
No. { 1,938, / 32,942. }
Patented July 30, 1861
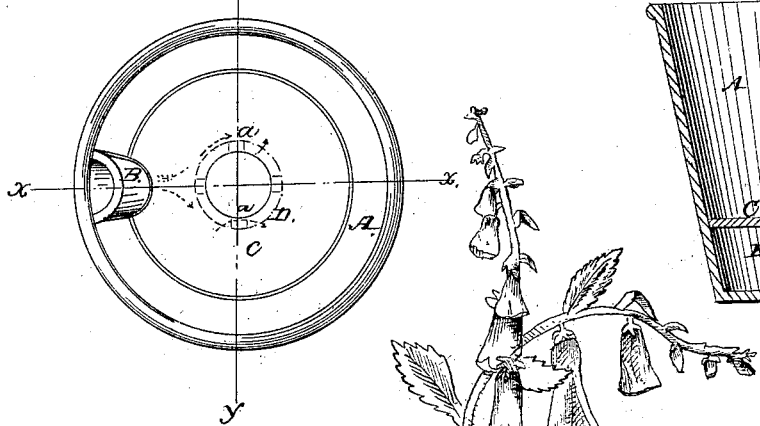
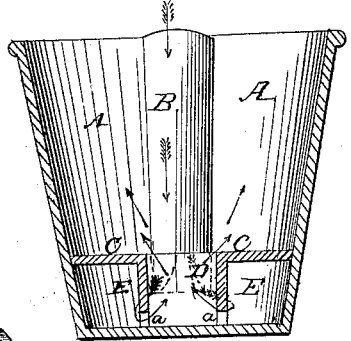
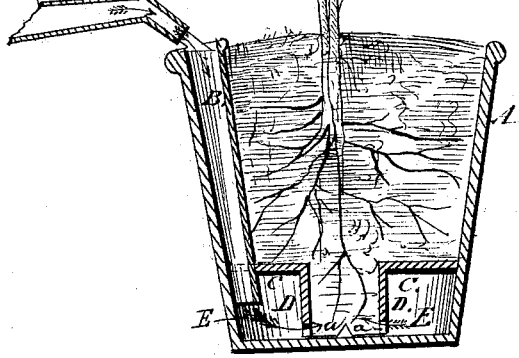
WITNESSES:
INVENTOR:

UNITED STATES PATENT OFFICE.

THOMAS GRIFFIN, OF ROXBURY, MASSACHUSETTS.

IMPROVEMENT IN FLOWER-POTS.

Specification forming part of Letters Patent No. 32,912, dated July 30, 1861.

*To all whom it may concern:*

Be it known that I, THOMAS GRIFFIN, of Roxbury, in the county of Norfolk and State of Massachusetts, have invented a new and useful Improvement in Flower-Pots; and I do hereby declare that the following is a full, clear, and exact description of the same, reference being had to the accompanying drawings, forming a part of this specification, in which—

Figure 1 is a vertical central section of a flower-pot constructed according to my invention. Fig. 2 is a plan or top view of the pot. Fig. 3 is also a vertical central section, but in the line $y\ y$ of Fig. 2, Fig. 1 being taken in the line $x\ x$ of Fig. 2.

My improvement consists in making the flower-pot with a tube or tubes on its inner circumference and with a movable annular partition or secondary bottom, said bottom having a vertical tubular extension on its under side, in the lower edge of which small notches or passages are cut. By thus constructing the flower-pot the water-supplying reservoir is brought inside of the dirt-chamber and the necessity of providing an external and separate water vase or saucer is obviated; and while this is the case, all the advantages arising from watering the plant at the base of the pot are secured.

To enable others skilled in the art to make and use my invention, I will proceed to describe it more minutely.

A represents the earth-chamber of the flower-pot. In form it is very similar to others now in use.

B is a vertical tube formed on the inner circumference of the chamber A. This tube extends from the top edge nearly to the bottom of the pot, as represented.

C is a secondary bottom or horizontal partition, with a passage through its center and a tubular extension, D, on its under side. The partition C is made separate from the earth-chamber A, and is supported by the extension D, which rests upon the first bottom of the earth-chamber. The passages $a\ a$ in the lower edge of the extension D form a communication between the water-chamber E E, which is formed by the two bottoms and the tubular extension; and the tube B serves as a means whereby to introduce water from the top into the chamber at the bottom of the pot, as clearly illustrated in the drawings.

My flower-pot, although constructed with a water-reservoir, is as neat and simple in appearance externally as the common flower-pots in use. It may be placed in a parlor or drawing-room, as there is no danger of water spilling upon objects and soiling them. It is portable, as there is no chance for the water to escape, and as no saucer is used with it there is very little danger of its being broken in handling; and in case it is desirable to transport plants a long distance it will be found very convenient, as the tube and the water-chamber hold sufficient water to meet the wants of the plants.

It will be readily seen from the foregoing and an inspection of the drawings that the water descends from the tube into the water-chamber and passes from said chamber through the passages $a\ a$ to the earth about the roots of the plants, from whence it circulates upward and escapes by evaporation. Thus a perfect moistening of the earth is kept up, and the danger of the earth caking and retarding the growth of the plant is obviated in the most perfect manner.

Having thus described my improved flower-pot, what I claim as my invention, and desire to secure by Letters Patent, is—

The flower-pot A, constructed with a vertical tube or tubes, B, on its inner circumference, in combination with an annular secondary bottom, C, which is constructed with a perforated tubular extension, D, all in the manner and for the purpose herein described.

THOMAS GRIFFIN.

Witnesses:
ELBRIDGE A. HOVEY,
R. P. ANDERSON.